United States Patent
Lam et al.

(10) Patent No.: US 6,988,266 B2
(45) Date of Patent: Jan. 17, 2006

(54) METHOD OF TRANSFORMING VARIABLE LOOPS INTO CONSTANT LOOPS

(75) Inventors: William K. Lam, Newark, CA (US); David S. Allison, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 698 days.

(21) Appl. No.: 09/851,018

(22) Filed: May 8, 2001

(65) Prior Publication Data

US 2004/0015915 A1    Jan. 22, 2004

(51) Int. Cl.
     G06F 9/45    (2006.01)
(52) U.S. Cl. ............... 717/160; 717/161; 717/150; 717/151
(58) Field of Classification Search ............... 717/150, 717/160, 161, 151
     See application file for complete search history.

(56) References Cited

U.S. PATENT DOCUMENTS

| | | | |
|---|---|---|---|
| 4,667,290 A | 5/1987 | Goss et al. | 364/300 |
| 5,121,498 A | 6/1992 | Gilbert et al. | 395/700 |
| 5,303,357 A | 4/1994 | Inoue et al. | 395/375 |
| 5,386,562 A | 1/1995 | Jain et al. | 395/650 |
| 5,797,013 A | 8/1998 | Mahadevan et al. | 395/709 |
| 5,950,007 A | 9/1999 | Nishiyama et al. | 395/707 |
| 6,009,272 A | 12/1999 | Goebel | 395/709 |
| 6,035,125 A | 3/2000 | Nguyen et al. | 395/709 |
| 6,247,173 B1 | 6/2001 | Subrahmanyam | 717/9 |
| 6,438,747 B1 * | 8/2002 | Schreiber et al. | 717/160 |
| 6,567,976 B1 * | 5/2003 | Wolf | 717/154 |
| 6,745,384 B1 * | 6/2004 | Biggerstaff | 717/156 |

OTHER PUBLICATIONS

H. T. Mouftah, "A Study on the implementation of three-valued Logic", 1976, ACM, pp. 123-126.*

* cited by examiner

Primary Examiner—Tuan Dam
Assistant Examiner—Qamrun Nahar
(74) Attorney, Agent, or Firm—Kudirka & Jobse, LLP

(57) ABSTRACT

A system and method for processing a variable looping statement into a constant looping statement to enable loop unrolling. A lower bound and an upper bound of the loop index within the variable looping statement are determined. A constant looping statement is then formed using the lower bound and upper bound to define a range over which the loop index varies within the constant looping statement. The constant looping statement further includes a conditional statement that reflects conditions in the initial expression and/or the exit expression of the variable looping statement. The conditional statement controls execution of the body of the generated constant looping statement, which includes the body from the original variable looping statement. Loop unrolling may then be performed on the generated constant looping statement.

18 Claims, 3 Drawing Sheets

```
FOR ( i=o; i<2; i=i+1)                      ⟵ 10
         ⎧ begin
         ⎪        out [ i ] = 8 ' b10101010;
    11  ⎨        enable [ i ] = up [ 2 * i ];
         ⎪ end
         ⎩
```

Figure 1

(Prior Art)

```
reg y [3:0];        ⟵ 13      ⟵ 12
WHILE ( x <= y )
        begin
                fpl_bit [ x + y ] - mm_iru [ x - y ];
        end
```

Figure 2

(Prior Art)

```
           ⟵16  ⟵18  ⟵20        ⟵ 14
FOR ( INIT; EXIT; INC )                  ⟵ 22
     begin
             BODY_OF_STATEMENTS;
     end
```

Figure 3

(Prior Art)

```
out [ 0 ] = 8 ' b10101010 ;
enable [ 0 ] = ~up [ 0 ] ;
out [ 0 ] = 8 ' b10101010 ;
enable [ 0 ] = ~up [ 2 ] ;
```
⎫
⎬ 24
⎭
*Figure 4*
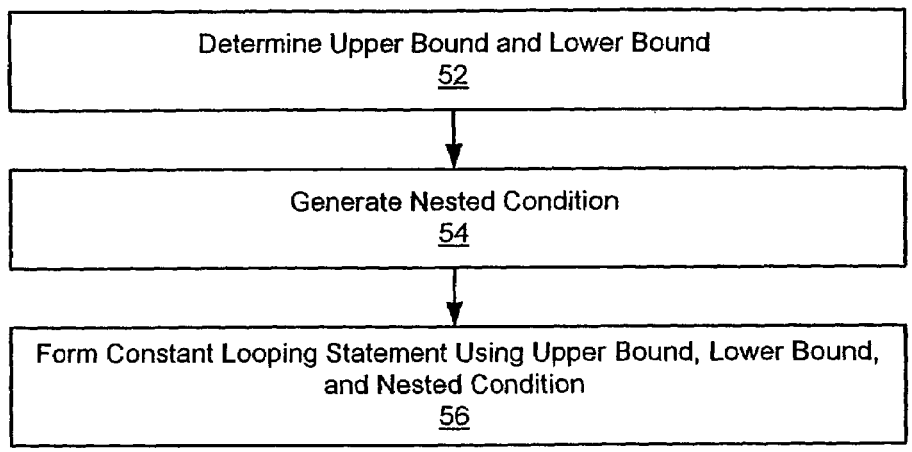
*Figure 5*
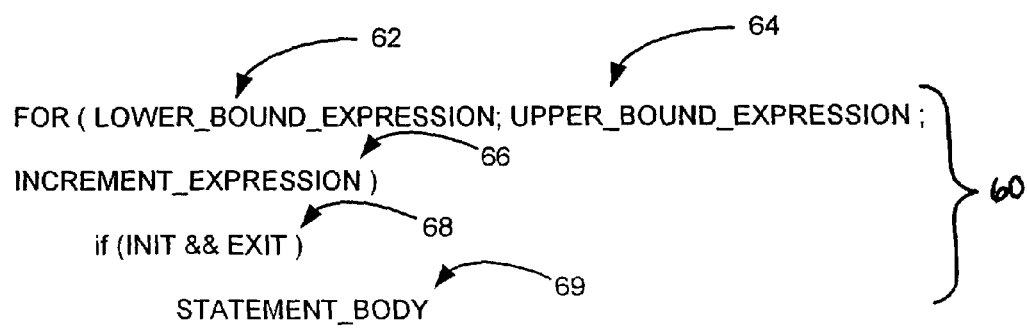
*Figure 6*

80
└── reg i [ 3 : 0 ];
82
└── reg j [ 1 : 0 ];
84
└── reg k [ 2 : 0 ];

70 { for ( j <= i ; i < k ; i = i + 1 )
                74      76
        statement_body
       72              78

Figure 7

90 {
  for ( m = i ; m < 7 ; m + + )
       92        94      96
    If ( j <=m & & m < k )
               98
        statement_body
                      100

Figure 8

110 {
  WHILE ( x <= 15 )
              112
    if ( x <= y )
           114
    begin
        fpl_bit [ x + y ] = mm_iru [ x - y ] ;
                                            116
    end

Figure 9

METHOD OF TRANSFORMING VARIABLE LOOPS INTO CONSTANT LOOPS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to optimization of computer programs written in Hardware Description Languages (HDLs), and more specifically to a method of transforming variable loops into constant loops.

In modern circuit design, particularly in the development of ASICs (Application Specific Integrated Circuits) and FPGAs (Field Programmable Gate Arrays), extensive use is made of models written using HDLs. Examples of tools for processing HDLs in use today include DesignCompiler™ of Synopsis, Inc., and DesignVerifier™ of Chrysalis. Examples of HDLs in use today include Verilog and VHDL (Very high speed integrated circuits HDL). In a typical design process, a hardware designer writes an HDL program representing the high level operation and/or design of a circuit. This HDL program may then be compiled and executed in order to test and verify the circuit design. Compilation of an HDL program is also sometimes referred to as "synthesizing" the HDL into a lower level representation of the circuit. The compiler for an HDL program is a type of computer aided design (CAD) system.

The compiled output of a CAD tool used to process an HDL program might describe a physical layout of gates which implement the circuit described by the HDL input. For example, in some systems, HDL is processed by what is referred to as a "gate synthesizer" program, the output of which is a "netlist" describing a network of gates within a physical circuit. The netlist output by a gate synthesizer may itself be used to test potential circuit designs, or even as the basis for automatic fabrication of actual circuits.

Circuit models written in HDL often involve looping statements. Illustrative types of looping statements are shown in FIG. 1 and FIG. 2. A "FOR" loop 10 looping statement is depicted in FIG. 1, and a "WHILE" loop 12 looping statement is shown in FIG. 2. The looping statements shown in FIG. 1 and FIG. 2 are specific examples of the many types of looping statements which may be employed to represent the structure of a circuit using an HDL.

In general, looping statements contain an initial expression, an exit expression, and an increment/decrement expression, as well as a loop body consisting of one or more of statements. For purposes of illustration, a generalized FOR loop statement 14 is shown in FIG. 3. The FOR loop statement 14 of FIG. 3 is shown including initial expression INIT 16, exit expression EXIT 18, increment/decrement expression INC 20, and a loop body BODY_OF_STATEMENTS 22.

Looping statements may be categorized into what are referred to as constant looping statements and variable looping statements. A looping statement is a constant looping statement if both the initial expression and the exit expression involve only constants and the loop index. If the initial expression and exit expression of a looping statement do not both involve only constants and the loop index, then that looping statement is considered a variable looping statement. The looping statement 10 of FIG. 1 is an example of a constant looping statement, and the looping statement 12 of FIG. 2 is an example of a variable looping statement.

Hardware models developed using HDLs are often compiled prior to execution. Many HDL compilers perform a type of compile time optimization known as "loop unrolling". Loop unrolling is a process in which loop overhead can be reduced by expressly replicating the body of the loop within the program, thus reducing the iterations through the loop. In some cases, a looping statement may be completely eliminated by replicating the loop body a number of times dictated by the initial, exit, and increment/decrement expressions of the loop statement. Loop unrolling simplifies compilation and makes it possible for many programs to be executed more efficiently. In particular, loop unrolling is known to enable greater degrees of program parallelization, thus potentially improving program execution speed.

Now considering FIG. 1, which is shown including a loop body 11, a loop unrolling optimization would transform the original looping statement 10 into the equivalent statements 24 of FIG. 4, completely eliminating the loop. As shown in FIG. 4, the loop index i from the original looping statement 10 of FIG. 1 is replaced by constants as the loop is unrolled. Based on the construction of the looping statement 10, the statements within the loop body 11 need to be performed twice.

A significant problem in existing computer aided design (CAD) systems for hardware circuit design, is that they fail to provide loop unrolling for variable looping statements. In particular, the above mentioned tools for processing HDLs—DesignCompiler™ of Synopsis, Inc., and DesignVerifier™ of Chrysalis, are unable to perform straightforward loop unrolling for variable looping statements. Accordingly, such existing systems cannot perform the transformation from the looping statement 10 of FIG. 1 to the statements 24 in FIG. 4 for variable looping statements, such as the looping statement 12 of FIG. 2. This problem arises from the fact that the exact number of times the loop body of a variable looping statement must be replicated cannot be determined at compilation time. Thus, variable looping statements are often not synthesizable into netlists or other circuit models developed from HDLs.

For these reasons, it would be desirable to have a system for processing HDL programs which is capable of unrolling variable looping statements.

BRIEF SUMMARY OF THE INVENTION

Consistent with the principles of the present invention, a system and a method for processing variable looping statements in order to perform loop unrolling are disclosed. The disclosed system and method include a technique for transforming a variable looping statement into a constant looping statement. In order to form the constant looping statement, a range of loop index values is determined, including at least the complete set of values the loop index in the variable looping statement may take on within the variable looping statement. In an illustrative embodiment, the determined range of loop index values is derived from the types of the variables used in the initial and exit expressions of the variable looping statement. An upper bound and a lower bound are generated reflecting the determined range of loop index values.

The constant looping statement formed by the disclosed system and method includes a loop index that varies between the upper bound and lower bound derived from the variable looping statement. The generated constant looping statement further includes a nested control statement, such as an "if" statement, which predicates execution of the body of the constant looping statement on a condition being satisfied. The condition checked within the nested control statement logically verifies that any conditions indicated by the initial expression and/or exit expression of the variable looping statement are met. Accordingly, while the generated upper and lower bounds may cause the loop index to assume values outside the range of values it would have taken on during execution of the original variable looping statement, the body of the generated constant looping statement is executed only in the event that conditions in both the initial expression and exit expression of the variable looping statement are satisfied. This advantageously allows use of upper and lower bounds in the generated constant looping statement that are not strictly "tight" without causing incorrect execution. In other words, the lower bound may be lower than the lowest possible loop index value in the variable looping statement, and the upper bound may be higher than the highest possible loop index value in the variable looping statement, without causing an incorrect loop index value to be applied to the body of the generated constant looping statement. The generated constant looping statement may then be unrolled in order to enable the various optimizations afforded by loop unrolling, such as increased parallelism during execution.

In an illustrative embodiment, the disclosed system is applicable to systems for processing HDL, such as HDL compilers. Since HDL models often are used to represent digital circuit designs, variables used within HDL programs typically represent lines or interfaces for electronically conveying binary logic signals between hardware components. Such interfaces may be individual lines, or groups of lines as in a data bus. Accordingly, variables used within an HDL model are often defined as "bit field" types of variables, within which each "bit" may take on the value 0 or 1, representing the state of an individual line or signal. The range of values bit field variables may take on is relatively limited, in comparison with the ranges of potential values for other types of variables. Due to the prevalence of bit field variables within HDL models, the initial expression and exit expression of variable looping statements in such models often involve comparison of the loop index with bit field variables. As a result, the determination of an upper and lower bound for a loop index may be based on the absolute ranges of the variables involved, without the risk of highly inefficient results. Moreover, the nested conditional statement employed by the disclosed system within the generated constant looping statement limits the number of unnecessary statements performed as a result of using bounds that are beyond the actual range of loop index values applied to the loop body. For these reasons, the disclosed system effectively provides a reasonably efficient technique for providing the benefits of loop unrolling to variable looping statements contained within programs such as programs written in an HDL.

BRIEF DESCRIPTION OF THE SEVERAL VIEWS OF THE DRAWING

The invention will be more fully understood by reference to the following detailed description of the invention in conjunction with the drawings, of which:

FIG. 1 shows an illustrative constant looping statement;
FIG. 2 shows an illustrative variable looping statement;
FIG. 3 shows a generalized looping statement;
FIG. 4 illustrates an unrolled looping statement;
FIG. 5 is a flow chart illustrating steps performed in an illustrative embodiment;
FIG. 6 illustrates a generalized constant looping statement generated by an illustrative embodiment;
FIG. 7 shows another example of a variable looping statement;
FIG. 8 shows a constant looping statement generated by an illustrative embodiment in response to the variable looping statement of FIG. 7; and
FIG. 9 shows a constant looping statement generated by an illustrative embodiment in response to the variable looping statement of FIG. 2.

DETAILED DESCRIPTION OF THE INVENTION

As shown in FIG. 5, in an illustrative embodiment, a series of steps are performed in order to process a variable looping statement such that the variable looping statement is transformed into a constant looping statement on which loop unrolling may be performed. The steps illustrated in FIG. 5 may be embodied within any specific type of computer program stored on a computer readable medium, and capable of execution on one or more processors within a computer system. For example, an executable program operable to perform the steps shown in FIG. 5 may be stored within a computer memory or program storage device that is communicably coupled to one or more processors operable to execute the computer program.

At step 52, the disclosed system determines an upper bound and a lower bound to be used to define a range of values for a loop index in a generated constant looping statement. The disclosed system determines the upper bound and lower bound at step 52 such that the range of values between the upper bound and lower bound includes all values that could be stored within the looping index of the variable looping statement. However, the upper bound and lower bound determined at step 52 need not include only those values that the looping index of the variable looping statement could take on. For example, the upper bound may be higher than the highest value that the looping index of the variable looping statement could receive. Similarly, the lower bound may be lower than the lowest value that the loop index of the variable looping statement could take on.

As part of the determination of the upper bound and lower bound at step 52, the disclosed system further determines a direction of the loop index within the variable looping statement. For example, the direction of the loop index in the variable looping statement is determined to be "up" in the event that the increment expression of the variable looping statement causes the loop index to increase. Such a loop index is also referred to as an "increasing" loop index. Similarly, the direction of the loop index in the variable looping statement is determined to be "down" in the event that the increment expression in the variable looping statement causes the loop index to decrease. This type of loop index is referred to as a "decreasing" loop index.

In an illustrative embodiment, the disclosed system examines the type of the loop index and the other variable or variables within the initial and exit conditions of the variable looping statement to determine the upper bound and lower bound at step 52. In both the case of a variable looping statement having an increasing loop index and the case of a variable looping statement having a decreasing loop index, the disclosed system may use the type(s) of the variables compared to the loop index to determine the upper bound and lower bound in step 52. However, in either the case of an increasing or decreasing loop index, if the type of the loop index allows storage of a more restricted range of values than the type(s) of one or more of the variables being compared with the loop index, then the value of one or both of the upper and lower bound may be determined based on the type of the loop index.

For example, in the case of a variable looping statement having an increasing loop index, the disclosed system may determine an upper bound at step 52 as being the highest value that can be stored in a variable that is compared to the loop index within the exit expression of the variable looping statement, based on the type of that variable. However, if the highest value that may be stored in the loop index itself is less than the highest value that may be stored in the variable being compared to the loop index within the exit expression of the variable looping statement, the upper bound determined at step 52 may be the highest value that may be stored within the loop index itself.

Also in the case of a variable looping statement having an increasing loop index, the disclosed system may determine a lower bound at step 52 that is the lowest value that may be stored in a variable being compared to the loop index within the initial expression of the variable looping statement, based on the type of that variable. However, if the lowest value that may be stored in the loop index itself is greater than the lowest value that may be stored in the variable being compared to the loop index within the initial expression of the variable looping statement, the lower bound determined at step 52 may be the lowest value that may be stored within the loop index itself.

In the case where the disclosed system determines that the variable looping statement employs a decreasing loop index, then the disclosed system may determine an upper bound at step 52 that is the highest value that may be stored in a variable being compared to the loop index within the initial expression of the variable looping statement, based on the type of that variable. However, if the highest value that may be stored in the loop index itself is less than the highest value that may be stored in the variable being compared to the loop index within the initial expression of the variable looping statement, then the upper bound determined at step 52 may be the highest value that may be stored within the loop index itself.

Also in the case of a variable looping statement having a decreasing loop index, the disclosed system may determine a lower bound at step 52 that is the lowest value that may be stored in a variable being compared to the loop index within the exit expression of the variable looping statement, based on the type of that variable. Again, in the case where the lowest value that may be stored in the loop index is greater than the lowest value that may be stored in the variable being compared to the loop index within the exit expression of the variable looping statement, the lower bound determined at step 52 may be the lowest value that may be stored within the loop index itself.

At step 54, the disclosed system determines a condition that is to be tested within the generated constant looping statement, such that the body of the generated looping statement is only executed when the condition is satisfied. In an illustrative embodiment, the condition determined at step 54 is tested within a nested control statement, such as an "if" statement, which predicates execution of the body of the generated constant looping statement on the condition being satisfied. The condition generated at step 54 logically verifies that any conditions indicated by the initial expression and/or exit expression of the variable looping statement are met before the loop body of the generated constant looping statement is executed. For example, in the case of a variable looping statement in which the initial expression and exit expression of the variable looping statement both consist of expressions in which the loop index is compared with one or more variables, then the condition generated at step 54 would be the logical "AND" of both the initial expression and the exit expression of the variable looping statement. In the case where only one of the initial expression or exit expression of the variable looping statement involves comparison of the loop index with a variable, then the condition generated at step 54 need only include the one of the initial expression or exit expression including comparison of the loop index with the variable.

At step 56, the disclosed system forms a constant looping statement that is functionally equivalent to the input variable looping statement. The constant looping statement formed at step 56 includes a loop index that varies across a range of values defined by the lower and upper bounds determined at step 52, and also includes a control statement which tests the condition generated at step 54. The body of the constant looping statement formed at step 56 is thus only executed in the event that the condition generated at step 54 is satisfied. The body of the constant looping statement formed at step 56 includes the body of the variable looping statement. In order to ensure correct operation, the disclosed system thus employs the condition generated at step 54 to ensure that the body of the generated constant looping statement is executed only in the event that conditions in both the initial expression and exit expression of the variable looping statement are satisfied. The constant looping statement formed at step 56 may then be unrolled in order to enable the various optimizations afforded in connection with loop unrolling. The below table summarizes key aspects of bounds generation for the constant looping statement in the illustrative embodiment:

| CASE | BOUNDS DETERMINATION |
| --- | --- |
| Increasing Loop Index, and maximum possible value for comparison variable in exit expression is less than maximum possible value of Loop Index | Upper Bound is maximum possible value for comparison variable |
| Increasing Loop Index, and maximum possible value for comparison variable in exit expression is greater than or equal to maximum possible value of Loop Index | Upper Bound is maximum possible value for Loop Index |
| Decreasing Loop Index, and minimum possible value for comparison variable in exit expression is greater than minimum possible value of Loop Index | Lower Bound is minimum possible value for comparison value |
| Decreasing Loop Index, and minimum possible value for comparison variable in exit expression is less than or equal to minimum possible value of Loop Index | Lower Bound is minimum possible value for Loop Index |

FIGS. 6–9 further illustrate the disclosed transformation of a variable looping statement into an equivalent looping statement for purposes of loop unrolling optimization. FIG. 6 shows a generalized constant looping statement 60 as would be generated by an illustrative embodiment of the disclosed system in response to the generalized looping statement shown in FIG. 3 in the case where the loop index of the variable looping statement is an increasing loop index. The generalized constant looping statement 60 of FIG. 6 is shown including a LOWER_BOUND_EXPRESSION 62, an UPPER_BOUND_EXPRESSION 64, and an INCREMENT_EXPRESSION 66. The LOWER_BOUND_EXPRESSION 62 compares the loop index of the constant looping statement 60 with a lower bound determined in response to the INIT expression 16 shown in FIG. 3, as described above with reference to step 52 of FIG. 5. The UPPER_BOUND_EXPRESSION 64 compares the loop index of the constant looping statement 60 with an upper bound determined in response to the EXIT expression 18 shown in FIG. 3, as also described above with reference to step 52 of FIG. 5. The INCREMENT_EXPRESSION 66 increases the value of the loop index in the constant looping statement 60 just as the INC expression 20 increased the value of the loop index in the looping statement 14 in FIG. 3. The condition 68 consists of the logical AND of the INIT expression 16 and the EXIT expression 18 of the looping statement 14 of FIG. 3. Accordingly, the STATEMENT_BODY 69 is only executed in the event that both the INIT expression 16 and the EXIT expression 18 are satisfied. The STATEMENT_BODY 69 includes the BODY_OF_STATEMENTS 22 of the looping statement 14 shown in FIG. 3.

FIG. 7 shows a variable looping statement 70. The initial expression 72 determines whether the loop index i is less than or equal to the value of the variable j. The exit expression 74 determines whether the loop index i is less than the value of the variable k. The increment expression 76 increments the loop index i following each execution of the loop body 78. In the example looping statement 70, the loop body is executed repeatedly while the initial expression 72 and exit expression 74 are true. The syntax of the for loop 70 shown is FIG. 7 is for purposes of illustration, and those skilled in the art will recognize that other specific for loop syntaxes exist that may also be processed by the disclosed system and method. Further in FIG. 7, the variable i is shown declared as a register type variable having four bits in the statement 80, variable j is shown declared as a register type variable having 2 bits in the statement 82, and the variable k is shown declared as a register type variable having 3 bits in the statement 84. In the example of FIG. 7, the register type variables i, j and k are illustrative of bit field variables. Those skilled in the art will recognize that other specific types of bit field variables are employed in various specific HDLs, and that the disclosed system is generally applicable to processing of variables of any type within initial and exit expressions, such as other specific bit field variable types. In the example of FIG. 7, the disclosed system determines that the maximum value of the variable i in the for loop 70 is controlled by the type of the variable k, since the maximum value that can be stored in k is 7, which is less than the maximum value of 15 that may be stored in i.

FIG. 8 shows a constant looping statement 90 derived by the disclosed system and method from the variable looping statement 70 of FIG. 7. As shown in FIG. 8, the initial statement 92 assigns the value of i to a variable m, since the value of i entering the statement body not determined within the looping statement. The disclosed system further operates to replace all instances of i within the statement body with the variable m, to ensure correctness. The variable m thus becomes the loop index for the constant looping statement 90 of FIG. 8.

In the exit expression 94 shown in FIG. 8, the loop index m is compared with the constant value 7, since 7 is the highest value that the register variable k can store. The maximum value that the register variable k can store is a value in which each of the 3 bits in k are set, resulting in a value of 7. The increment expression 96 increments the loop index m after each iteration through the statement body 100, corresponding to the addition of 1 to the loop index in the increment expression 76 of FIG. 7. As also shown in FIG. 8, the constant looping statement 90 further includes a condition 98 that is tested before the statement body 100 is executed. If the condition 90 is not satisfied, then the statement body 100 is not executed. The condition 98 is shown as the logical AND of the initial expression 72 and the exit expression 74 in the variable looping statement 70 of FIG. 7, except with the loop index i replaced by the loop index m.

FIG. 9 shows a constant looping statement 110 as would be generated by an illustrative embodiment of the disclosed system in response to the variable looping statement 12 shown in FIG. 2. In the constant looping statement 110, shown for purposes of illustration as a "while" loop, a test condition 112 determines whether the variable x is less than or equal to the constant 15. Thus it is shown that the disclosed system determined that the variable y in the variable looping statement 12 of FIG. 2 could not represent a value larger than 15, since y is a register variable that is 4 bits wide. The constant looping statement 110 further includes a condition 114 that is tested before the loop body 116 is executed. The condition 114 is the same as the test condition 13 in the variable looping statement 12 of FIG. 2.

Those skilled in the art should readily appreciate that the programs defining the functions of the disclosed system and method for processing variable looping statements can be implemented in and delivered to a specific embodiment of the disclosed system in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments are described as implemented in computer software, the functions within the illustrative embodiments may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. In particular, while some of the illustrative embodiments are described in connection with processing of FOR loops, the disclosed system and method are also applicable to any other specific types of control statements that execute a section of code a specified number of times. Accordingly, the actual syntax and usage of the variable looping statement processed by the disclosed system and method may vary from language to language. Similarly, while the illustrative embodiments are described in connection with use of a nested control statement consisting of an "if" conditional statement, the disclosed system and method may alternatively employ any other specific types of conditional statements that affect the flow of execution through a program, such as a CASE statement. Accordingly, the invention should not be viewed as limited except by the scope and spirit of the appended claims.

What is claimed is:

1. A method executed in a computer system for processing software source code with a variable looping statement having a loop index, an initial expression, an exit expression and a body, wherein at least one of the initial and exit expressions depends on a variable other than the loop index, to enable loop unrolling, comprising:
   determining from the initial expression and the exit expression, a constant upper bound;
   determining from the initial expression and the exit expression, a constant lower bound;
   determining a condition that must be satisfied, said condition reflecting any conditions within the initial expression and the exit expression; and
   replacing the variable looping statement in the software source code with a constant looping statement, wherein said upper bound and said lower bound define a range of values for a loop index within said constant looping statement, wherein said constant looping statement includes a nested conditional statement which tests said determined condition, wherein a body of said constant looping statement comprises the body of said variable looping statement, and wherein said body of said constant looping statement is only executed in the event that said determined condition is satisfied.

2. The method of claim 1, wherein said determining said condition comprises forming a logical "AND" of an initial condition within said initial expression of said variable looping statement and an exit condition within said exit expression of said variable looping statement.

3. The method of claim 1, further comprising determining whether said variable looping statement includes an increasing loop index value.

4. The method of claim 3, further comprising:
   in the event that said variable looping statement includes said increasing loop index value, said determining of said lower bound comprises determining a lower bound of said initial expression of said variable looping statement.

5. The method of claim 3, further comprising:
   in the event that said variable looping statement includes said increasing loop index value, said determining of said upper bound comprises determining an upper bound of said exit expression of said variable looping statement.

6. The method of claim 1 further comprising determining whether said variable looping statement includes a decreasing loop index value.

7. The method of claim 6, further comprising:
   in the event that said variable looping statement includes said decreasing loop index value, said determining of said lower bound comprises determining a lower bound of said exit expression of said variable looping statement.

8. The method of claim 6, further comprising:
   in the event that said variable looping statement includes said decreasing loop index value, said determining of said upper bound comprises determining an upper bound of said initial expression of said variable looping statement.

9. A system for processing software source code with a variable looping statement having a loop index, an initial expression, an exit expression and a body, wherein at least one of the initial and exit expressions depends on a variable other the loop index to enable loop unrolling, said system including a computer readable memory having one or more computer instructions stored thereon, said instructions comprising:
   instructions operative to determine from the initial expression and the exit expression, a constant upper bound;
   determining from the initial expression and the exit expression a constant lower bound;
   instructions operative to determine a condition that must be satisfied, said condition reflecting any conditions within the initial expression and the exit expression; and
   instructions operative to replace the variable looping statement in the software source code with a constant looping statement, wherein said upper bound and said lower bound define a range of values for a loop index within said constant looping statement, wherein said constant looping statement includes a nested conditional statement which tests said determined condition, wherein a body of said constant looping statement comprises the body of said variable looping statement, and wherein said body of said constant looping statement is only executed in the event that said determined condition is satisfied.

10. The system of claim 9, wherein said instructions operative to determine said condition comprise instructions operative to form a logical "AND" of an initial within said initial expression condition of said variable looping statement and an exit condition within said exit expression of said variable looping statement.

11. The system of claim 9, further comprising instructions operative to determine whether said variable looping statement includes an increasing loop index value.

12. The system of claim 11, further comprising: instructions operative, in the event that said variable looping statement includes said increasing loop index value, to determine said lower bound by determining a lower bound of said initial expression of said variable looping statement.

13. The system of claim 11, further comprising: instructions operative, in the event that said variable looping statement includes said increasing loop index value, to determine said upper bound by determining an upper bound of said exit expression of said variable looping statement.

14. The system of claim 9 further comprising instructions operative to determine whether said variable looping statement includes a decreasing loop index value.

15. The system of claim 14, further comprising:
   instructions operative, in the event that said variable looping statement includes said decreasing loop index value, to determine said lower bound by determining a lower bound of said exit expression of said variable looping statement.

16. The system of claim 14, further comprising: instructions operative, in the event that said variable looping statement includes said decreasing loop index value, to determine said upper bound by determining an upper bound of said initial expression of said variable looping statement.

17. A computer program product including a computer readable medium, said computer readable medium having a computer program stored thereon, said computer program for processing software source code with a variable looping statement having a loop index, an initial expression, an exit expression and a body, wherein at least one of the initial and exit expressions depends on a variable other than the loop index to enable loop unrolling, said computer program comprising:

program code for determining from the initial expression and the exit expression, a constant upper bound;

program code for determining from the initial expression and the exit expression, a constant lower bound;

program code for determining a condition that must be satisfied, said condition reflecting any conditions within the initial expression and the exit expression; and program code for replacing the variable looping statement in the software source code with a constant looping statement, wherein said upper bound and said lower bound define a range of values for a loop index within said constant looping statement, wherein said constant looping statement includes a nested conditional statement which tests said determined condition, wherein a body of said constant looping statement comprises the body of said variable looping statement, and wherein said body of said constant looping statement is only executed in the event that said determined condition is satisfied.

18. A system for processing software source code with a variable looping statement having a loop index, an initial expression, an exit expression and a body, wherein at least one of the initial and exit expressions depends on a variable other than the loop index, to enable loop unrolling, comprising:

means for determining from the initial expression and the exit expression, a constant upper bound;

means for determining from the initial expression and the exit expression a constant lower bound for a loop index within paid variable looping statement;

means for determining a condition that must be satisfied, said condition reflecting any conditions within the initial expression and the exit expression; and means for replacing the variable looping statement in the software source code with a constant looping statement, wherein said upper bound and said lower bound define a range of values for a loop index within said constant looping statement, wherein said constant looping statement includes a nested conditional statement which tests said determined condition, wherein a body of said constant looping statement comprises the body of said variable looping statement, and wherein said body of said constant looping statement is only executed in the event that said determined condition is satisfied.

* * * * *

UNITED STATES PATENT AND TRADEMARK OFFICE
CERTIFICATE OF CORRECTION

| | | |
|---|---|---|
| PATENT NO. | : 6,988,266 B2 | Page 1 of 1 |
| APPLICATION NO. | : 09/851018 | |
| DATED | : January 17, 2006 | |
| INVENTOR(S) | : William K. Lam and David S. Allison | |

It is certified that error appears in the above-identified patent and that said Letters Patent is hereby corrected as shown below:

Column 12,
Line 7, please delete "for a loop index within paid variable looping statement"

Signed and Sealed this

Fifteenth Day of August, 2006

JON W. DUDAS
*Director of the United States Patent and Trademark Office*